United States Patent [19]
Gorski et al.

[11] Patent Number: 6,149,035
[45] Date of Patent: Nov. 21, 2000

[54] FOOD AND BEVERAGE DISPENSING SYSTEM

[75] Inventors: Chris W. Gorski, Fort Atkinson; Michael Heinz, Watertown, both of Wis.

[73] Assignee: Karma, Inc., Watertown, Wis.

[21] Appl. No.: 09/372,969

[22] Filed: Aug. 12, 1999

[51] Int. Cl.$^7$ ..................................................... B67D 5/00
[52] U.S. Cl. .......................... 222/129.4; 222/56; 222/64; 222/146.1; 222/145.6
[58] Field of Search .......................... 222/56, 64, 129.1, 222/129.3, 129.4, 145.5, 145.6, 146.1

[56] References Cited

U.S. PATENT DOCUMENTS

| | | | |
|---|---|---|---|
| 2,843,293 | 7/1958 | Burgoyne | 222/129.4 |
| 3,266,670 | 8/1966 | Brooks et al. | |
| 3,347,416 | 10/1967 | Hamilton | 222/56 |
| 3,643,835 | 2/1972 | Popinski | 222/56 |
| 3,671,020 | 6/1972 | Krup | 222/129.4 |
| 4,366,920 | 1/1983 | Greenfield, Jr. et al. | 222/145 |
| 4,488,664 | 12/1984 | Cleland | 222/56 |
| 4,649,809 | 3/1987 | Kanezashi | 222/129.4 |
| 4,718,579 | 1/1988 | Brody et al. | 222/129.4 |
| 5,316,180 | 5/1994 | Cleland | 222/56 |
| 5,353,963 | 10/1994 | Gorski et al. | 222/129.1 |
| 5,975,357 | 11/1999 | Topar | 222/56 |

*Primary Examiner*—J. Casimer Jacyna
*Attorney, Agent, or Firm*—Andrus, Sceales, Starke & Sawall, LLP

[57] ABSTRACT

A food and beverage dispensing system having a main dispenser for holding and dispensing a food or beverage mixture comprised of water and dry concentrate. A replenishing dispenser is connected to and stationed entirely independent of the main dispenser. The replenishing dispenser has a mixing valve for automatically and periodically blending proportioned amounts of the water and dry concentrate to form the food or beverage mixture. The mixing valve intermittently dispenses a controlled amount of the food or beverage mixture therefrom. The replenishing dispenser also has a reservoir located below the mixing valve for receiving, holding and periodically delivering a food or beverage mixture to the main dispenser in accordance with the amount of food or beverage mixture dispensed from the main dispenser.

18 Claims, 8 Drawing Sheets

FOOD AND BEVERAGE DISPENSING SYSTEM

FIELD OF THE INVENTION

This invention relates broadly to an apparatus for dispensing liquid food and beverages and, more particularly, pertains to a system for automatically preparing a water and dry concentrate mixture at one location, and then delivering and replenishing such mixture for dispensing on demand at a second location remote from the first location.

BACKGROUND OF THE INVENTION

Post mix and pre mix food and beverage systems are known in the art for blending and dispensing a food or beverage concentrate with a diluent such as water. Typical post mix dispensers are designed to separately store and automatically combine at the time of dispensing, a concentrate and hot or cold water at a predetermined ratio in order to consistently produce a beverage product which is acceptable for consumption. One type of commercially available post mix dispenser is disclosed in assignee's U.S. Pat. No. 5,353,963 issued to Gorski et al on Oct. 11, 1994.

In contrast, pre mix dispensers include at least one and usually two bowls for holding, blending, temperature treating and dispensing relatively large amounts of various pre mixed concentrate and water mixtures. In some instances, the pre mix dispenser is equipped with cooling equipment to enable dispensing of a non-carbonated, chilled or iced drink, the latter being known as a slush, slurpee, or granita. In other cases, the cooling equipment is replaced by a heating arrangement so that metered quantities of hot liquid food or beverages, such as coffee, hot chocolate, tea, or soup may be delivered.

The disadvantage of the pre mix dispenser, especially one that is used to serve a cold beverage or a slush, is that when its bowl becomes empty, one can no longer dispense and sell products until a new batch of beverage is hand-mixed, poured into the bowl and is chilled to the proper desired serving temperature. With a slush-type beverage, this length of cooling time can be as long as one hour. The downtime required to effect refilling of the pre mix dispensers results in lost sales which are most detrimental during periods of peak demand.

It has been recognized that it would be advantageous to provide pre mix dispensers with an arrangement for automatically preparing measured amounts of concentrate and water, and supplying the resulting food and beverages into the bowls of the pre mix dispensers. Such an arrangement must function to automatically and periodically operate to maintain a consistent and nearly full supply of concentrate and water mixture whereby the practice of mixing full supplies of liquid beverages and food products in separate vessels and manually transferring these products into the bowls of pre mix dispensers for cooling or heating can be avoided.

While post mix and pre mix dispensers deliver products formed from both liquid and dry concentrates mixed with water, many vendors prefer the use of dry concentrate (powdered, freeze dried or granulated) because of its condensed form and profitability. Use of dry concentrate, however, does present some solubility problems due to the presence of sugar in the dry concentrate and the tendency of the concentrate to become sticky or lumpy in the presence of excess moisture, such as from a high humidity environment.

One machine which is specially designed and constructed to intermittently operate and mix together measured volumes of water and dry, powdered or granulated beverage concentrate and to deliver beverages established thereby into a supply tank of a related beverage dispensing machine is shown in U.S. Pat. No. 4,488,664 issued Dec. 18, 1984 to Cleland. In this patent, an attachment unit is removably engaged on the open top of a supply tank of a pre mix beverage dispensing machine, and operates to replenish the machine when the liquid level in the tank lowers to a predetermined level and until the level rises to a predetermined high level.

There are two major disadvantages to the above-described, top mounted attachment unit. One problem is that when the attachment unit is set on top of the pre mix dispenser which sits on a standard thirty-six inch countertop, one must be well over six feet tall to safely refill and/or remove the attachment unit for both its cleaning as well as the cleaning of the pre mix dispenser bowls. The other major disadvantage is that some dry concentrate bases do not mix well with ambient temperature water and some also require mechanical high speed motor mixing to ensure solubility. The Cleland attachment unit utilizes ambient temperature water and has no mechanical mixing capability as the dry concentrate and water mixture is being prepared.

Because of the disadvantages discussed above, owners of beverage dispensing machines have expressed a desire for an apparatus that can be connected to and located remote, that is spaced apart from, the pre mix dispenser. More particularly, there is a need for a replenishing post mix dispenser to be positioned, for example, under the countertop, behind the pre mix dispenser, or in another room. In addition, it is desirable that such a replenishing dispenser contemplate the use of hot or cold water as well as a high speed mixing device so as to minimize any solubility problems in forming the food or beverage mixture. It is further desirable to prevent moisture from forming lumps in the dry concentrate. It is also desirable to provide the replenishing dispenser with a pump-equipped reservoir for ensuring the solubility of the formed mixture and improving the deliverability of the mixture to the pre mix dispenser. Furthermore, it is desirable to provide a replenishing dispenser which receives water from a standard water line or from a self-contained source, so as to establish portability of the post mix dispenser.

SUMMARY OF THE INVENTION

The present invention advantageously provides an improved beverage dispensing system wherein a remote post mix dispenser is employed to automatically maintain a nearly full bowl level in a pre mix dispenser. The post mix dispenser is connected to the pre mix dispenser in such a way that it is fully responsive to the changing levels of liquid food or beverage mixtures being metered out of the pre mix dispenser.

It is one object of the present invention to provide a food and beverage dispensing system used to produce a quality liquid food or beverage product comprised of a water and dry concentrate mixture.

It is another object of the present invention to provide a pre mix dispenser with a replenishing post mix dispenser located in spaced relationship apart from the pre mix dispenser so as to improve the cleaning and servicability of the post mix dispenser.

It is a further object of the present invention to provide a dispensing system for improving the solubility of a wide variety of liquid beverage or food products.

Yet a further object of the present invention is to provide a food and beverage dispensing system wherein a separate post mix dispenser automatically mixes and fills a pre mix dispenser in response to changing levels of the food or beverage product in the pre mix dispenser.

Still another object of the present invention is to provide a more versatile food and beverage dispensing system which will produce a variety of hot and cold liquid food and beverage products.

These and other objects are realized in one aspect of the invention by a water and dry concentrate type, food and beverage dispensing system having a primary dispenser provided with at least one bowl for holding and dispensing a temperature-controlled food or beverage mixture comprised of water and dry concentrate. A secondary dispenser is connected and located remote from the primary dispenser, and is constructed and arranged to automatically prepare and supply a food or beverage mixture to the primary dispenser in accordance with the amount of food and beverage mixture dispensed from the primary dispenser.

In another aspect of the invention, a food and beverage dispensing and replenishing system includes a pre mix dispenser having at least one bowl for holding and dispensing a food or beverage which is comprised of water and dry concentrate. The pre mix dispenser also has a temperature controlling arrangement for maintaining the food or beverage mixture in a predetermined temperature range. A post mix dispenser is placed in communication with and positioned in spaced relationship apart from the pre mix dispenser. The post mix dispenser has a hopper for holding and periodically dispensing the concentrate. A tank is provided for holding and periodically supplying the water, and a mixing valve is provided for combining the concentrate from the hopper and the water from the tank to form a water-dry concentrate mixture periodically dispensed from the mixing valve. A reservoir is employed for receiving the water and the concentrate mixture from the mixing valve, and eventually supplying the water-dry concentrate mixture to the bowl on the pre mix dispenser so as to replenish the food or beverage mixture dispensed from the pre mix dispenser.

Still another invention relates to a food and beverage dispensing system having a main dispenser for holding and dispensing a food or beverage mixture comprised of water and dry concentrate. The improvement resides in a replenishing dispenser connected to and stationed entirely independent of the main dispenser. The replenishing dispenser has a mixing valve for automatically and periodically blending proportioned amounts of the water and dry concentrate to form the food or beverage mixture. The mixing valve intermittently dispenses a controlled amount of the food or beverage mixture therefrom. The replenishing dispenser also has a reservoir located below the mixing valve for receiving, holding and periodically delivering the food or beverage mixture to the main dispenser in accordance with the amount of food or beverage mixture dispensed from the main dispenser.

Various other features, objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
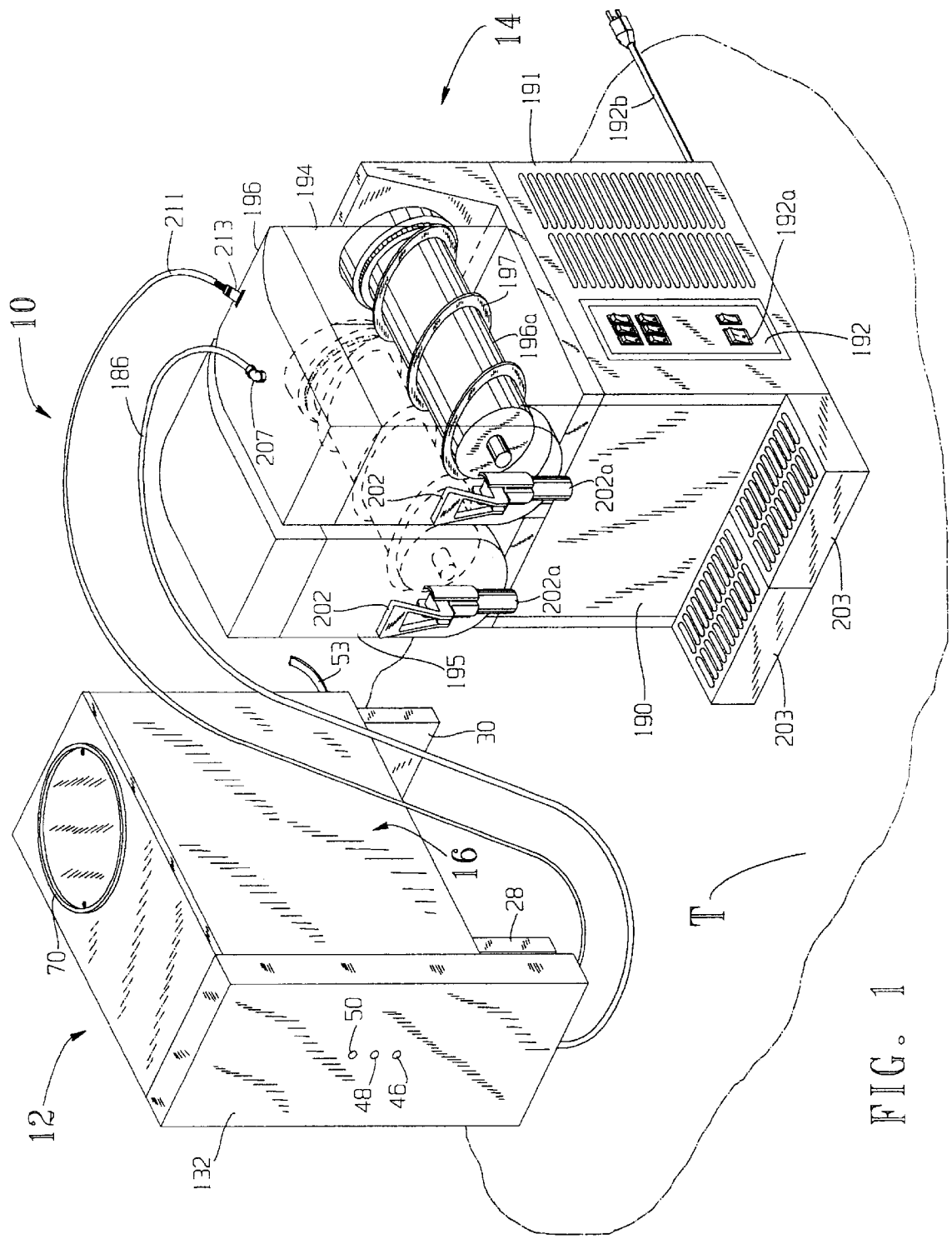
FIG. 1 is a perspective view of a post mix dispenser and a pre mix dispenser forming a food and beverage dispensing system embodying the present invention.

The food and beverage dispensing system 10 of the present invention shown in FIG. 1 employs a modified post mix dispenser 12 which is adapted to automatically combine food and beverage concentrate such as juice, fruit drink, coffee, tea, or soup concentrate with a diluent, such as water, and discharge the formed mixture on demand to a pre mix dispenser 14. In the preferred embodiment, pre mix dispenser 14 is used to dispense two similar or different non-carbonated, pre mixed, chilled or iced fruit drinks. However, it should be appreciated that the system 10 can be adapted to dispense a variety of other cold as well as hot food and beverage products. It should likewise be understood that while the present invention can be designed for use with liquid or syrup concentrates, the system 10 is particularly attractive in forming a food and beverage mixture comprised of water and dry concentrate. The latter is defined to include powdered, granulated and freeze-dried bases which may, for example, include a flavoring together with a sweetener, such as sugar.

Figure 2:
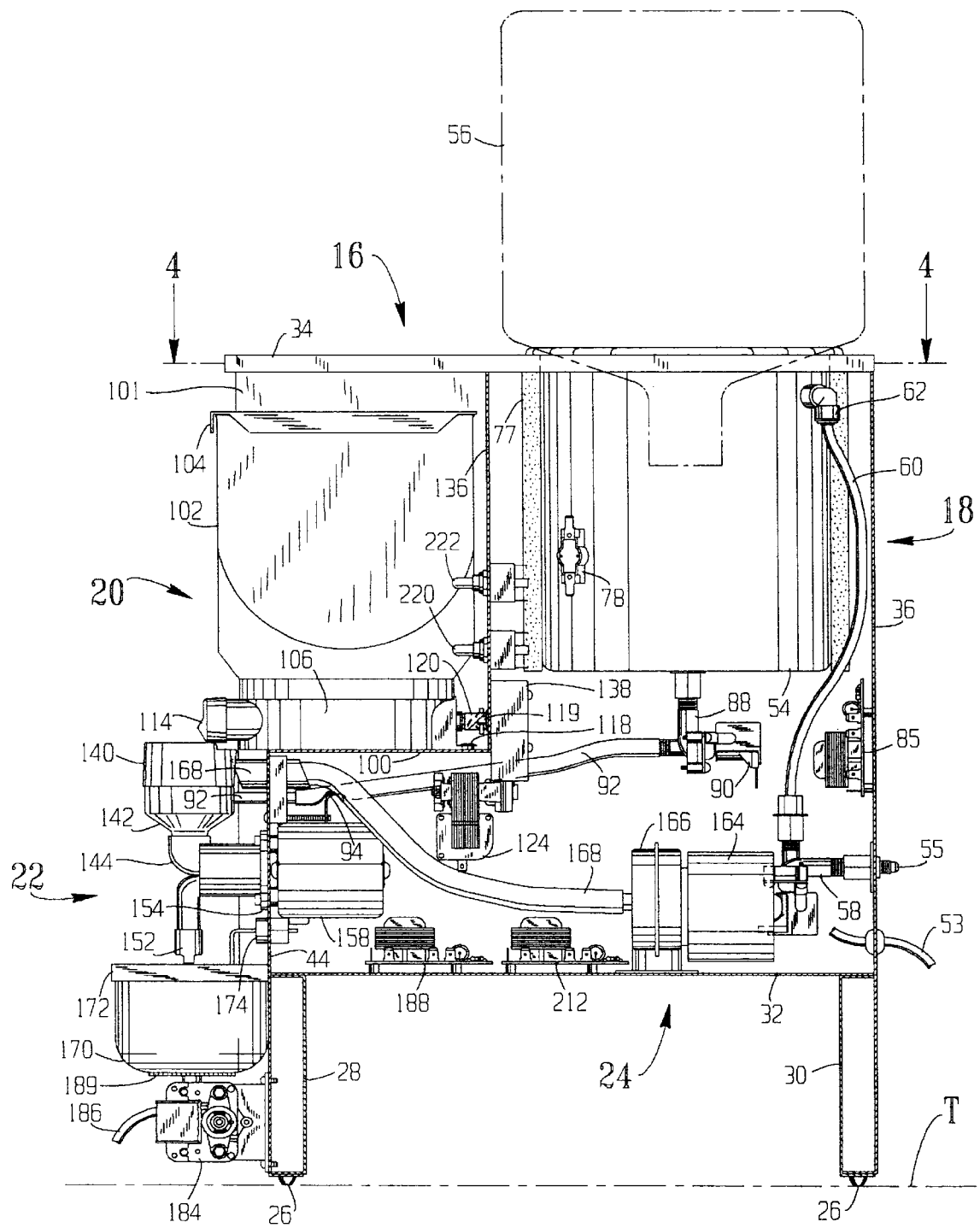
FIG. 2 is a side elevational view of the post mix dispenser shown in FIG. 1 with a portion of its housing broken away.
Figure 3:
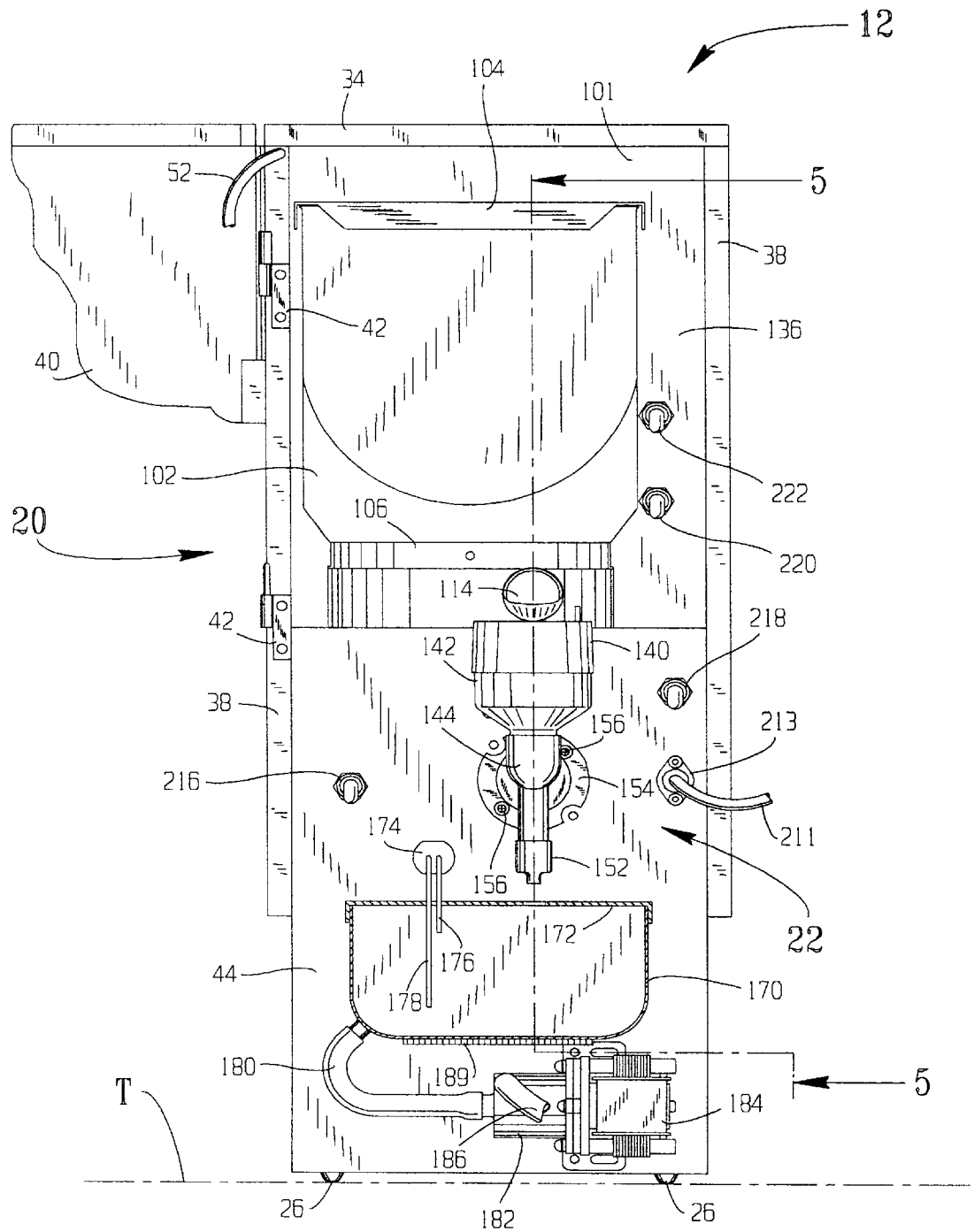
FIG. 3 is a front elevational view of the post mix dispenser of FIG. 1 with its hinged door swung open.

The post mix dispenser 12 is shown as being positioned on a countertop or table T typically raised about thirty-six inches from the floor. The overall dimensions of the post mix dispenser 12 may be, in one embodiment, about twenty-four inches high, ten inches wide, and twenty-two inches deep. Referring to FIGS. 1–3, post mix dispenser 12 is an upright, box-like structure comprising a main housing 16 for enclosing and/or mounting a water tank assembly 18, a dry concentrate hopper assembly 20, a mixing valve assembly 22, a blower motor assembly 24, and a series of electrical components, all of which will be described in further detail hereafter.

Housing 16 is supported by a series of adjustable feet 26 attached to the lower end of a front leg 28 and a rear leg 30 of a bottom panel 32. Housing 16 is further formed by a top panel 34, a back panel 36, a pair of parallel side panels 38, a swingable door 40 mounted by hinges 42, and a lower front panel 44 located behind door 40. The exterior surface of door 40 is provided with a first indicator light 46 of one color, preferably green, which serves to indicate when the system is in an automatic mode, a second indicator light 48 of another color, preferably amber, which shows when the system 10 is in a manual mode, and a third indicator light 50 of a third color, preferably red, to indicate refilling of the water tank assembly in a portable mode, as will be further described. Electrical power for the lights 46,48,50 is provided through a door cable 52 (FIG. 3) connected with a source of electrical power carried by a live cord 53.

Figure 6:
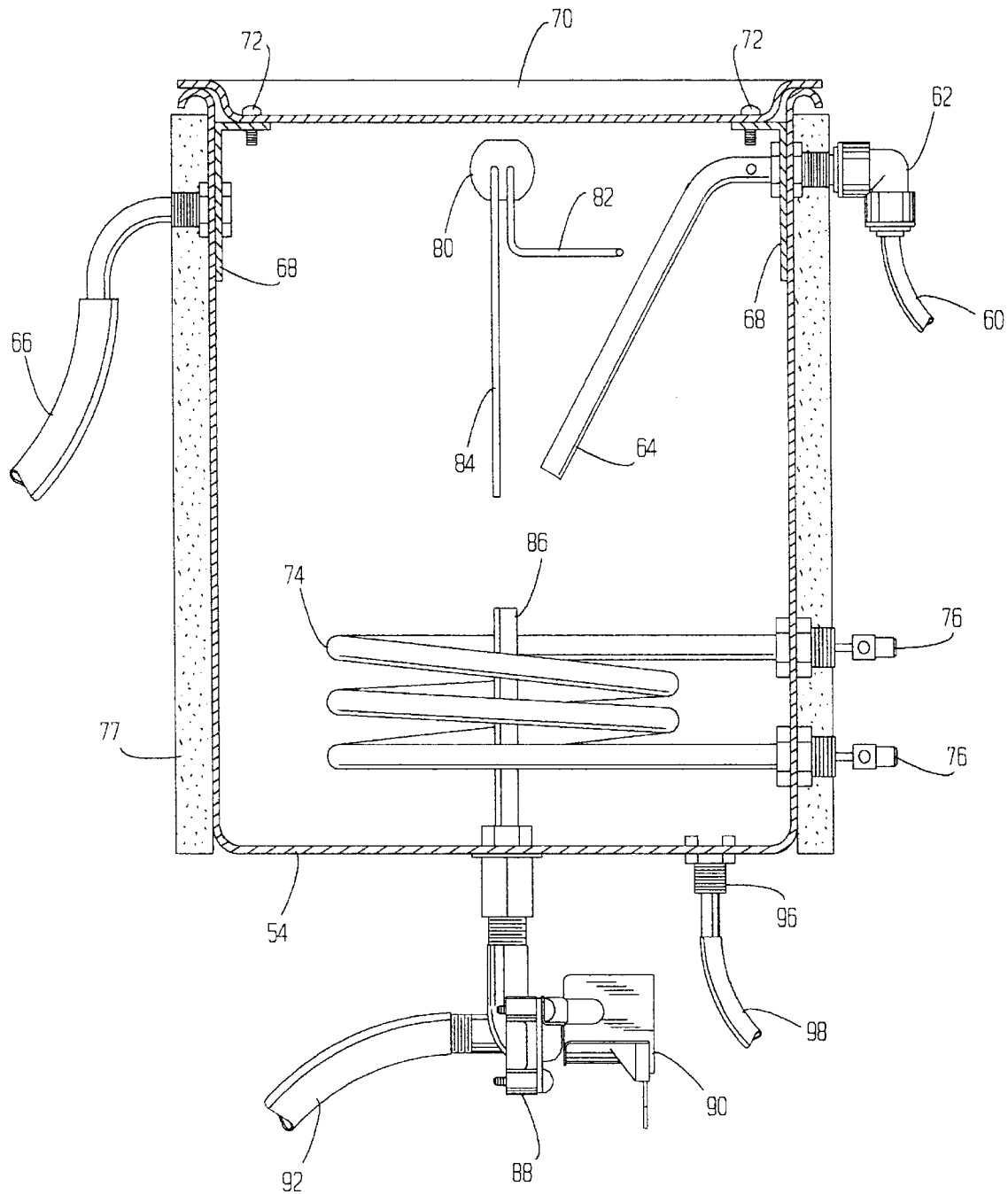
FIG. 6 is a cross sectional view of the water tank taken on line 6—6 of FIG. 4.

As seen in FIGS. 2 and 6, the upper rear portion of housing 16 includes a self-contained, metallic, cylindrical container 54 which is suspended from the top panel 34 and is intended to hold a diluent source, such as water, supplied from a standard water line connection 55. Alternatively, water can be supplied from an onboard refillable vessel 56 completely independent of such external source, so as to create an aspect of portability with respect to the diluent.

In the preferred embodiment, water is either delivered into container 54 via water line connection 55, associated inlet valve 58, water line tubing 60, elbow fitting 62, and fill tube 64, or is manually replenished through the top of the container 54, or supplied by the replacement diluent holder, such as a water bottle 56 (seen in phantom lines of FIG. 2) in direct communication with cylindrical container 54. Suitable tubing 66 is connected by a fitting to a bracket 68 and serves as an overflow conduit. In the first two applications identified above, a removable cover 70 (FIGS. 1,6) is fastened to the bracket 68 by screws 72 to close the container 54. In the examples involving manual replenishing of container 54 or use of replaceable vessel 56, it can be stated that such applications are open to atmosphere or gravity fed, such that there is no dependence on the existence, operability, or parameters of the well known water line connection.

Figure 4:
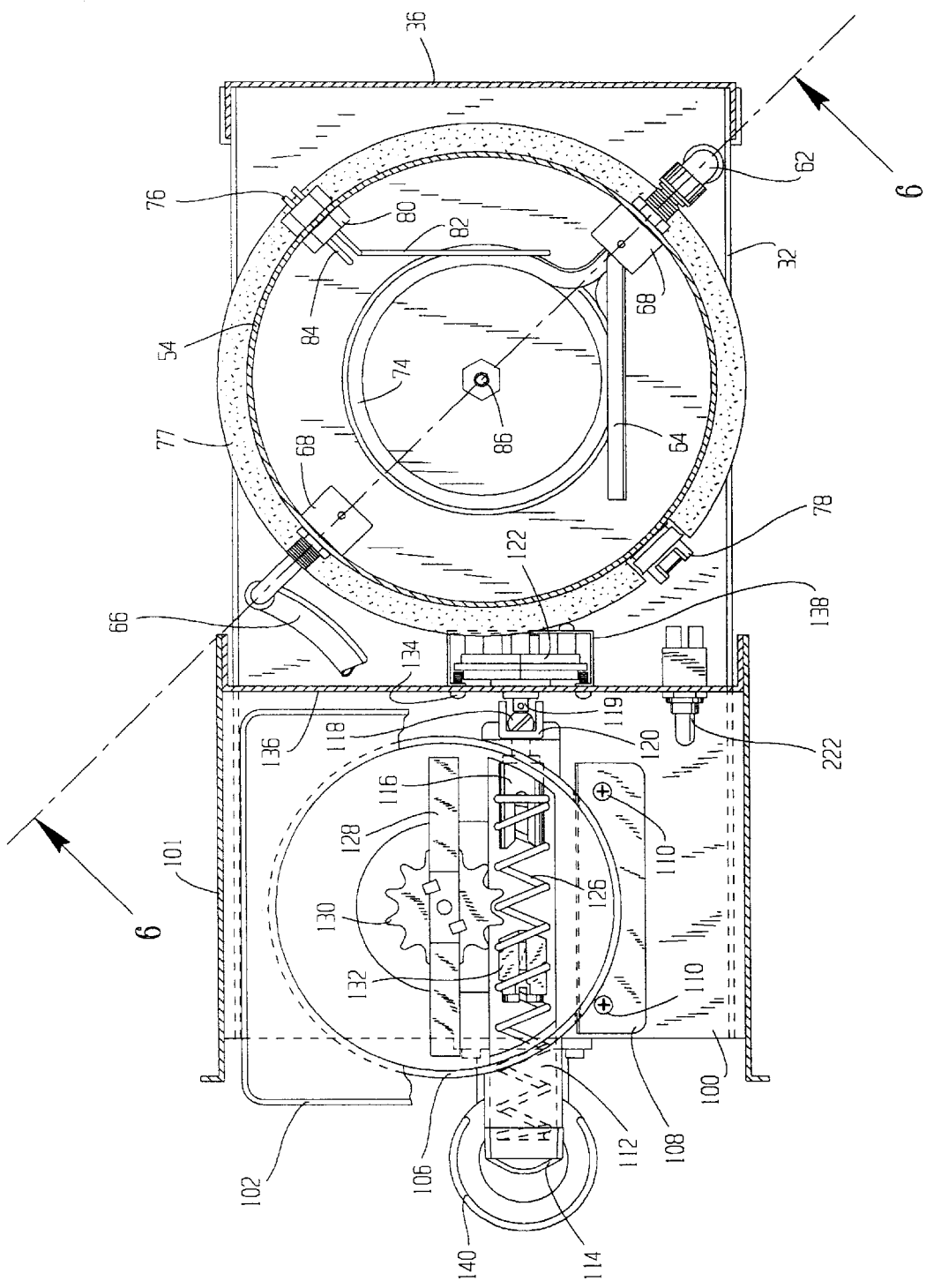
FIG. 4 is a top view of the post mix dispenser taken on line 4—4 of FIG. 2.

With further reference to FIGS. 4 and 6, the inside bottom wall of container 54 is provided with a circular heating coil 74 and a pair of electrical terminals 76 projecting from the side wall of container 54 for connection with a source of electrical energy. The container 54 is surrounded by insulation 77 and includes a thermostat 78 for regulating the desired temperature of the water inside container. This arrangement maintains the water inside container 54 at substantially greater than 120° F., so as to improve the solubility of the mixture to be formed by the water and dry concentrate. Container 16 also includes a water level sensor or first probe assembly 80 for continuously monitoring the water supply. The probe assembly 80 has a short horizontal probe 82 for establishing a maximum water level, and a long vertical probe 84 for establishing a minimum water level. The water tank probe assembly 80 is electrically connected by a line to a water tank level control circuit board 85 mounted on the back panel 36 of the housing 16. The circuit board 85 has commercially available control devices which will operate to shut off the flow to the water inlet valve 58 when water engages the short probe 82. In addition, the circuit board 85 will operate to turn on the flow from the water inlet valve 58 when water falls below the short probe 82. A stand tube 86 extends vertically upwardly from the bottom of container 54 and allows the water of container 54 to normally flow to a dispense valve 88 suspended beneath container 54. Dispense valve 88 has a valve coil 90 which is used to periodically deliver, via dispense tubing 92, a predetermined quantity of heated water to a portion of the mixing valve assembly 22 positioned at the front of the housing 16. The dispense tubing 92 includes a water flow adjustment device 94 (FIG. 5) which can be selectively implemented to meter an appropriate amount of water to be mixed with the dry concentrate and thus control the desired taste of a food or beverage serving. A drain fitting 96 capable of being opened and closed is fitted to the bottom of the container 54 and is provided with suitable tubing 98 through which the container 54 can be drained, if desired.

Turning to FIGS. 2–5, the hopper assembly 20 is mounted on a horizontal support plate 100 in the upper front portion 101 of the housing 16. The hopper assembly 20 includes a downwardly tapering hopper 102 for holding a dry concentrate, a removable cover 104 (FIG. 3), and a generally circular base 106 through which the dry concentrate is dispensed in a predetermined quantity into the mixing valve assembly 22. A hopper bracket 108 (FIG. 4) is attached to the horizontal support plate 100 by a pair of fasteners 110, and is slidably engageable with the base 106 to provide easy removal when it is necessary to refill the hopper 102. The base 106 is provided with a tubular, concentrate-receiving passageway 112 having a dispensing spout 114 at its front end, and a stub shaft 116, a hopper stud 118, and a drive clevis 120 at its rear end mechanically connected for rotation through a gear box 122 and motor 124. An auger spring 126 is attached to the stub shaft 116 such that actuation of the motor 124 will rotate the auger spring 126 so as to advance a quantity of dry concentrate from the spout 114. The bottom of hopper 102 includes a wing-like, dry concentrate agitator 128 carried by a rotatable star wheel 130 operably engaged with the auger spring 126. As the auger spring 126 rotates, the agitator 128 and the star wheel 130 are likewise rotated so as to break up any lumps in the dry concentrate and provide generally free flow of the concentrate into the tubular passageway 112. The forward end of the auger spring 126 carries a rotatable plug 132 which is adjustable to change the amount of dry concentrate dispensed from the spout 114.

As best seen in FIG. 4, the stub shaft 116 is coupled by means of the drive clevis 120 and hopper fastener 118 to an output shaft 119 of the gear box 122 fastened by screws 134 to a vertical support plate 136 on the water container side thereof. Gear box 122 is fixed by screws to the vertical support plate 136 by a bracket 138 and includes an input shaft driven by an electrical motor 124. With this arrangement, energization of the motor 124 will be transferred through the gear box 122 so as to rotate the auger spring 126 and enable advancement of the dry concentrate in the hopper assembly 20 from the spout 114 to the top of the mixing valve assembly 22.

Figure 5:
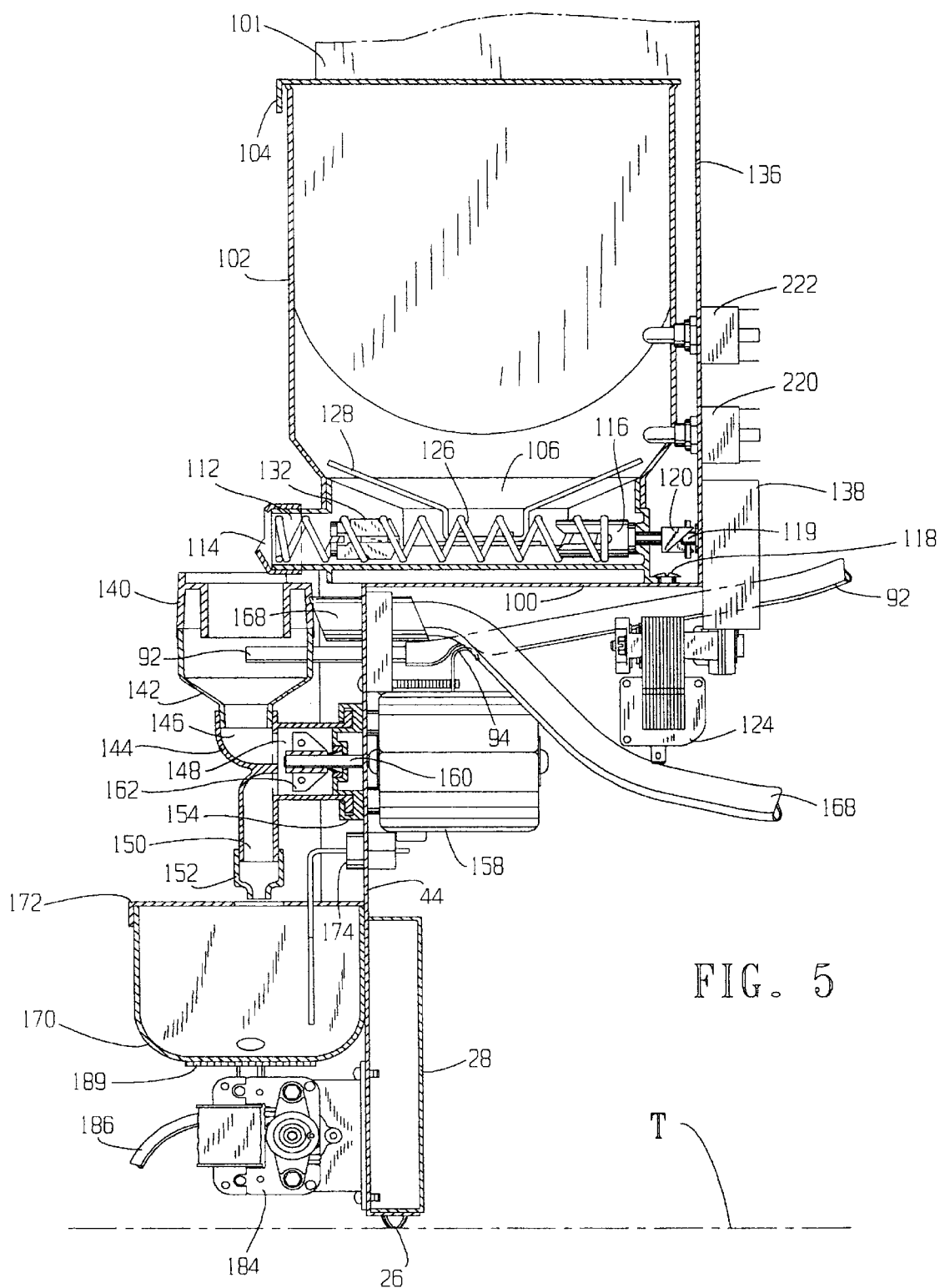
FIG. 5 is a cross sectional view taken on line 5—5 of FIG. 3.

Mixing valve assembly 22 is depicted in FIGS. 2, 3 and 5 and is comprised of a funnel cap 140 into which the concentrate is delivered, a funnel 142 into which the water dispense tubing 92 is received and a generally cylindrical, blender housing 144 for mixing the dry concentrate and the hot water together. The blender housing 144 is constructed with an upper dry concentrate and water receiving portion 146, a cylindrical mixing channel 148, and a lower dispensing portion 150 having a flow restrictor 152. The blender housing 144 is fixedly secured by means of a blender base 154 joined by fasteners 156 to the front side of lower front panel 44. A high speed (10,000 rpm) whipper motor 158 is mounted on the backside of the lower front panel 44 behind the blender base 54 and includes a rotatable drive shaft 160 and accompanying whipper blade 162 which extends into the blender housing 144 for mixing the contents of the upper portion 146. In order to minimize lumping of the dry concentrate caused by high humidity which may be present in the environment, the blower motor assembly 24 is anchored to the bottom panel 32 of housing 16, as illustrated in FIG. 2. The blower assembly 24 includes a vacuum motor 164, a vacuum blower 166, and an air tube 168 connected to the funnel cap 144 creating a suction force which will remove excess humidity and enable continuous free flow of the dry concentrate base from the hopper assembly 20 to the funnel 142.

It should be appreciated that some food and beverage products do not mix well with ambient temperature water and that some also require high speed motor mixing to ensure solubility. Applicants have discovered, that in formulating the food and beverage products in the post mix dispenser 12, it is preferable that hot water (at slightly greater than 120° F.) must be used in addition to a timed period of high speed whipper mixing (at about 10,000 rpm) in order to more completely dissolve additives, particularly sugar sweetener, contained in the dry concentrate base and discharge a fully soluble mixture transferable to the pre mix dispenser 14 in the system 10. High speed blending of the dry concentrate and hot water enables a mixture cooled slightly to about 90° F. to be dispensed through the flow restrictor 152 on the lower portion of the blender housing 144.

As a salient feature of the invention, the food or beverage mixture formulated in the blender housing 144 is dispensed into a holding reservoir 170 mounted to the lower front panel 44 below the mixing valve assembly 22. The reservoir 170 preferably has a removable cover 172 suitably apertured to receive the mixture through the flow restrictor 152. The reservoir 170 has a second probe assembly 174 for monitoring the level of liquid mixture therein. The probe assembly 174 includes a short probe 176 which senses a maximum fill level and a long probe 178 for monitoring a minimum fill load. A pump inlet tubing 180 connects the inside of the reservoir 170 with a transfer pump 182 and associated motor 184, both of which are secured to the lower front panel 44 beneath the reservoir 170. The pump 182 also has a pump outlet tubing 186 for periodically supplying a portion of the mixture in the reservoir 170 to pre mix dispenser 12, as will be detailed hereafter. The reservoir probe assembly 174 is electrically connected with a reservoir level control circuit board 188 (FIG. 2) positioned on a forward portion of the bottom panel 32. The circuit board 188 has commercially available control devices which operate to regulate the level of dry concentrate and water mixture in the reservoir 170 according to certain conditions in the pre mix dispenser, as will be detailed hereafter. The bottom of the reservoir 170 may optionally be provided with a foil heater 189 (FIG. 3) which is used to deter bacteria growth in the mixture held in the reservoir 170. The reservoir is important because it provides added insurance that the sugar or additive in the dry concentrate has fully dissolved. In addition, the reservoir liquid mixture level maintains head pressure and prevents loss of prime for the pump 182.

Figure 8:
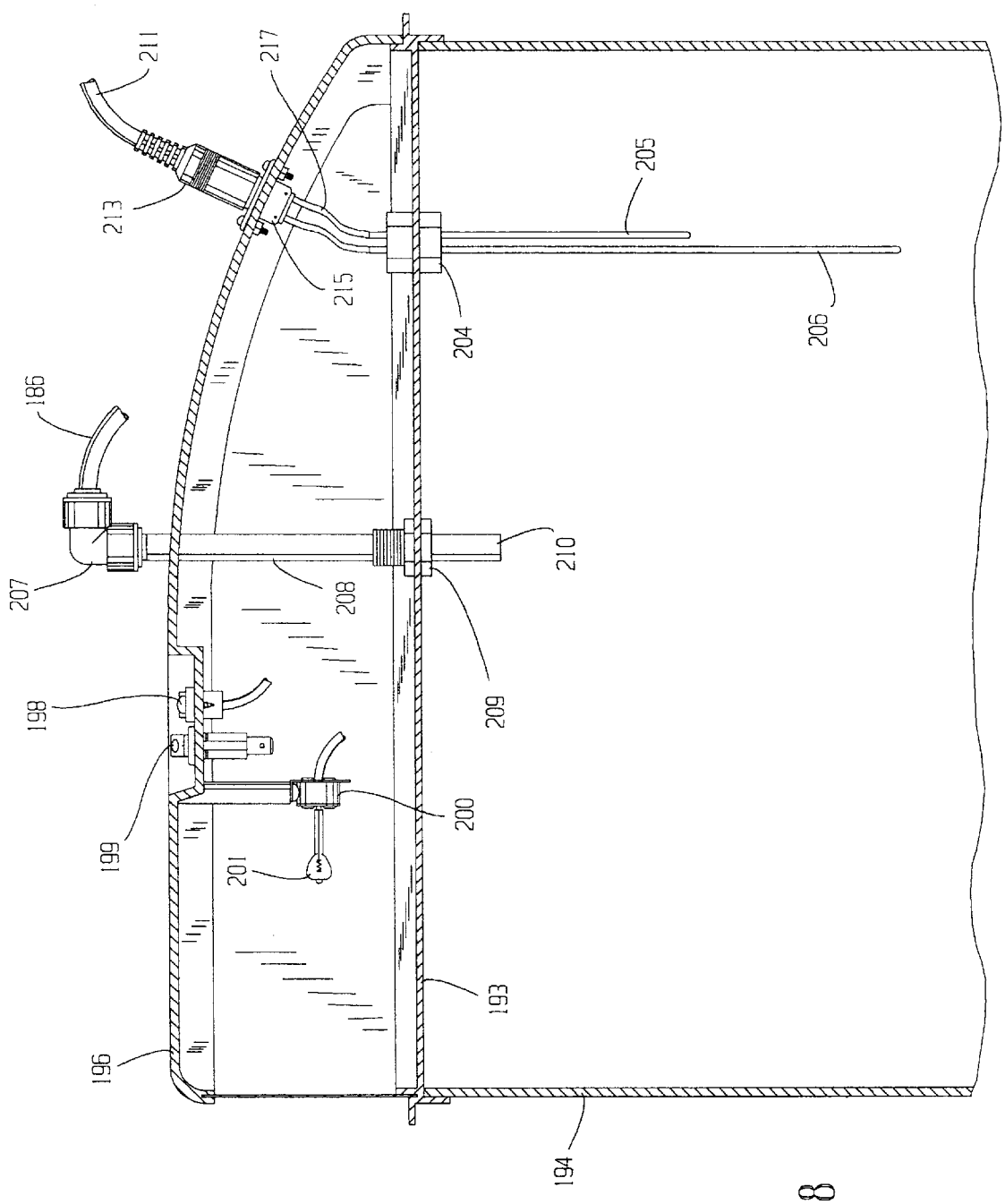
FIG. 8 is a cross sectional view of the cover of the pre mix dispenser.

Referring now to FIG. 1, in a preferred embodiment, pre mix dispenser 14 is positioned on table T and has dimensions of about thirty-four inches high, fifteen inches wide and twenty inches deep. The pre mix dispenser 14 has a stainless steel housing 190 for enclosing cooling equipment, such as a coil, a fan and a compressor, and supporting at least one and preferably two generally transparent bowls 194,195 holding a dry concentrate and water mixture. Housing 190 includes a ventilation panel 191 and a control panel 192 having an on-off switch 192*a* and other controls. Suitable electrical power is supplied through line cord 192*b* to run the components of premix dispenser 14. Each bowl 194,195 has a lighted, raised cover 196 and includes an evaporator 196*a* for cooling the mixture and internal blending equipment 197 for continuously churning the mixture. As seen in FIG. 8, cover 196 has a flanged base 193 which rests upon the top edge of the bowl 194. Cover 196 is also provided with a first lamp socket 198, a lamp switch 199, and a second lamp socket 200 carrying a light bulb 201. Sockets 198,200 are connected to a source of electrical power in order to illuminate the cover 196. In addition, each bowl 194,195 is provided with a dispensing handle 202 for spout 202*a* for manually delivering a desired amount of mix into a container (not shown) supported beneath the handle 202 on a drip tray 203 projecting from the front of the housing 190. In the preferred application, each bowl 194,195 holds a separate flavored, partially frozen, dry concentrate and a water mixture which is temperature treated by the cooling equipment to form a food or beverage product known as a slush, slurpee or granita. Each bowl 194,195 is provided with a third probe assembly 204 having a short probe 205 and a long probe 206 for monitoring the level of the food or beverage mixture. For simplicity, only the details of the probe assembly 204 for the rightmost bowl 194 is shown, it being understood that similar structure exists for the remaining bowl 195. Pump outlet tubing 186 extends from the reservoir 170 of the post mix dispenser 12 to a quick connect elbow 207 in communication with a vertical tube 208 extending through and fixed in place on cover 196 with an inlet tube fitting 209 and a depending inlet tube 210. This tubular arrangement enables the mixture in the reservoir 170 to be selectively transferred to the bowl 194. An electrical low voltage control cable 211 passes through the lower front panel 44 and connects a pre mix machine level control circuit board 212 positioned on the bottom panel 32 of post mix dispenser housing 16 with a cable plug 213, a cable socket 215, probe wires 217, and the third probe assembly 204 in the bowl 194.

In accordance with the invention, the post mix dispenser 12 acts as a secondary dispenser in communication with and positioned in spaced relationship apart from the pre mix or primary dispenser 14, and functions to automatically replenish the mixture dispensed from the pre mix dispenser 14. That is, the post mix or replenishing dispenser 12 is connected to and stationed entirely independent of the pre mix dispenser 14. It should be appreciated that while the post mix dispenser 12 is shown in FIG. 1 in spaced lateral relationship with the pre mix dispenser 14, it can be placed behind the pre mix dispenser 14, under the table T, and even in another room with appropriate lengths of outlet tubing 186 and control cable 211. The inventive system was specifically created so that the remote post mix dispenser 12 using a dry concentrate base can be employed to automatically maintain a full bowl level in the pre mix dispenser 14.

Figure 7:
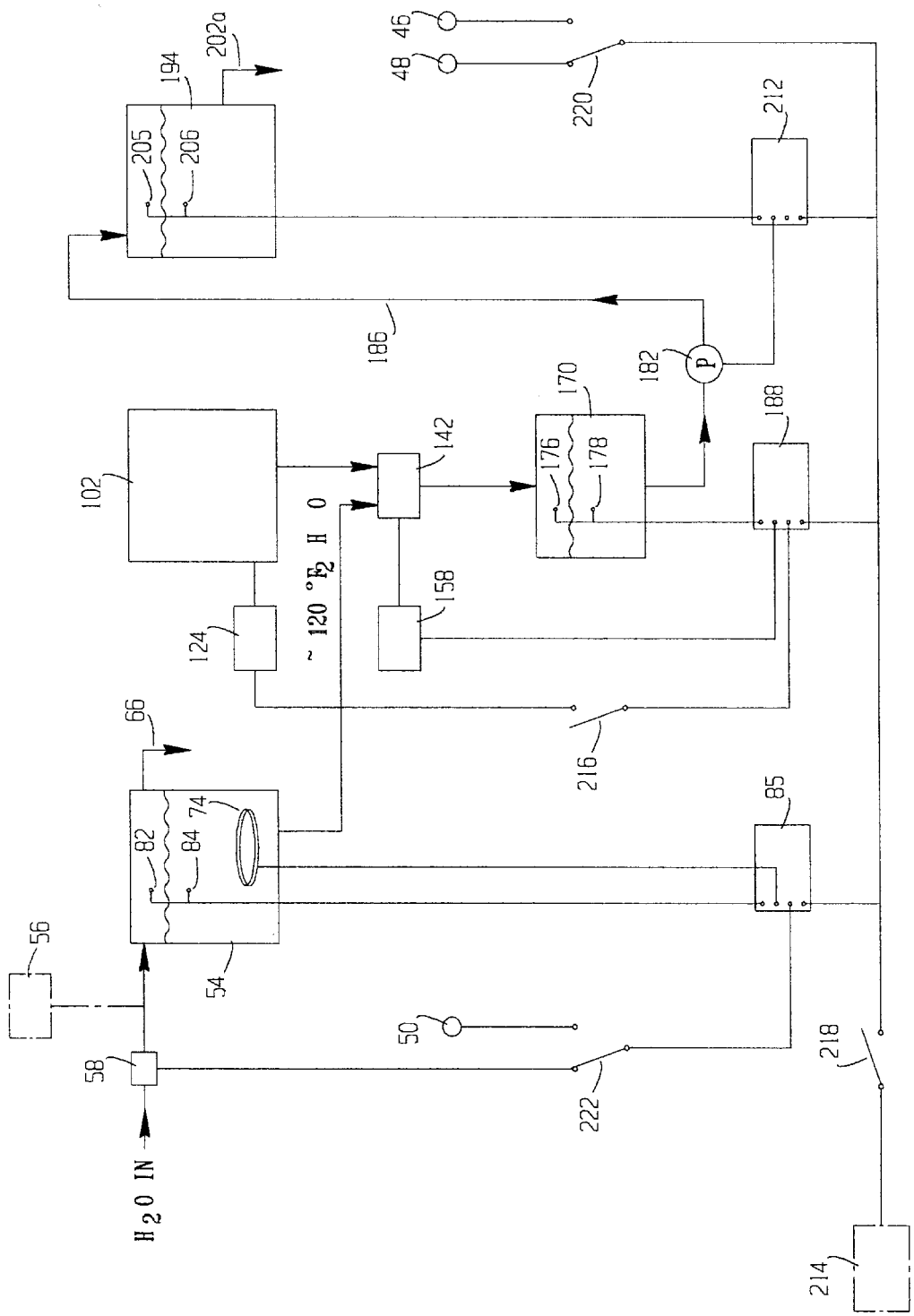
FIG. 7 is a schematic diagram of the food and beverage dispensing system shown in FIG. 1.

Referring to FIGS. 3 and 7, the dispensing system 10 includes a source of electrical power 214 and appropriate connection lines for energizing the necessary components and providing light and necessary controls in both the post mix dispenser 12 and premix dispenser 14. In order to control certain aspects of the system, the lower front panel 44 of the post mix dispenser 12 carries a two-position, flush switch 216 which when turned on enables only hot water from the water tank container 54 to travel through the entire system 10 so as to clean the same. The panel 44 also has a two-position, main switch 218 for enabling normal operation using either a water line connection or a portable water source. In addition, a manual/auto switch 220 is provided on the vertical support plate 136 of post mix dispenser housing 16. When in the manual position, the indicator light 48 on door 40 is amber, when in auto position the indicator light 46 is green. Also, a selector or function switch 222 is provided above the manual/auto switch 220 to select either the water line connection mode or the portable water container mode.

In operation, with the function switch 222 turned to the water line position, and with the post mix dispenser 12 connected to the water line connection, the main switch 218 is turned on enabling electrical power to engage the electrical components of the system 10. In like fashion, switch 192*a* of premix dispenser 14 is also turned on. If the pre mix dispenser bowl 194 has not yet been filled, the manual/auto switch 220 is flipped to the manual position to activate the post mix dispenser 12 to fill the reservoir 170 with the dry concentrate and water mixture and then pump the mixture to the bowl 194 until the mixture reaches the short probe 205 of the third probe assembly 204. The mixture in the bowl 194 is cooled for a time by means of the cooling equipment and evaporator 196*a* until the consistency of the mixture is a slush-type beverage. As the slush is manually dispensed serving-by-serving, the liquid level in the bowl 194 will begin descending. If both the short and long probes 205,206 sense liquid, there is no need for the post mix dispenser 12 to come on because the liquid mixture in the bowl 194 is within a proper dispensing range. However, once the mixture falls below the short probe 205 in the bowl 194, the reservoir pump 182 will be activated pumping the mixture from the reservoir 170 in the post mix dispenser 12 to the pre mix dispenser bowl 194 until the mixture again contacts the short probe 205. If both probes 205,206 do not sense the liquid, a fail-safe condition exists, and no automatic filling from the post mix dispenser 12 can occur. During the bowl filling process, the mixture level in the reservoir 170 drops below short probe 176, thus turning on post mix dispenser 12 and keeping it dispensing newly formed mixture into the reservoir 170 until the level of mixture reaches the short probe 176 thus shutting off the post mix dispenser 12. If during the pre mix dispenser bowl refilling process, the level of mixture in reservoir 170 drops below the long probe 178, a fail safe condition results in that the reservoir pump 182 turns off until the mixture level in the reservoir 170 reaches the long probe 178 Once this occurs, the pump 182 will again be activated, refilling the pre mix dispenser bowl 194 until the proper level is reached sensed by the short probe 205 located in bowl 194 at which time the reservoir pump 182 shuts off.

Once the bowl 194 has been initially filled, the manual/auto switch 220 is placed in the up or automatic position so that the system 10 will continue to automatically mix and fill the bowl 194, as described above.

The present invention enables a user to locate the replenishing post mix dispenser 12 at a site removed from the water line when only electrical power is necessary. In this version, the main switch 218 is placed in the "off" position, the function switch 222 is moved to the portable mode after which the container 54 is manually filled with water or the portable water vessel 56 is placed in communication with the empty container 54, and the main switch 218 is again turned on so as to begin heating the water in the container 54. Normal auto fill operation commences when the water is at the desired temperature. In portable use, the red indicator light 50 on the outside of door 40 will light, indicating the water tank container 54 must again be refilled.

It should be appreciated that the remote placement of the post mix dispenser 12 greatly enhances the servicability of the system 10 because the post mix dispenser 12 can be positioned at heights which do not require extensive reaching or scaling of a ladder. It should also be realized that the invention makes use of hot water and a whipping motor 158 to ensure the highest solubility of certain dry concentrates with water. It should be understood, that the remote post mix dispenser 12 can also be used with ambient or cool water. It should be likewise understood that the system 10 will function with a pre mix dispenser 14 having heating equipment if, for example, the desired food or beverage product is a soup or warm beverage.

In the description above, it is important to note that post mix dispenser 12 could have more than one hopper assembly 20, reservoir 170 and pump 182, since each bowl 194,195 in the premix dispenser 14 would require its own dedicated remote refill system.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth in the following claims.

We claim:

1. A water and dry concentrate type, food and beverage dispensing system comprising:

a primary dispenser having at least one bowl for holding and dispensing a temperature-controlled food or beverage mixture comprised of water and dry concentrate; and a secondary dispenser connected to and located remote from the primary dispenser, and including a mixing valve assembly for preparing and dispensing the food or beverage mixture and a reservoir for receiving the food or beverage mixture from the mixing valve assembly and holding the food or beverage mixture, the secondary dispenser being constructed and arranged to automatically prepare and supply the food or beverage mixture to the primary dispenser in accordance with the amount of the food or beverage mixture dispensed from the primary dispenser.

2. The system of claim 1, wherein the primary dispenser includes cooling equipment.

3. The system of claim 1, wherein the secondary dispenser includes a water container equipped with a heating device.

4. The system of claim 1, including at least one probe assembly in the primary dispenser for monitoring the level of the mixture in the bowl and at least one probe assembly in the secondary dispenser for monitoring the level of liquid in the water container.

5. The system of claim 1, wherein the reservoir includes a heating apparatus for preventing bacteria buildup in the mixture in the reservoir.

6. The system of claim 1, wherein the reservoir includes a pump and outlet tubing connected between the reservoir and the bowl of the primary dispenser, the pump being capable of periodically transferring the food or beverage mixture in the reservoir to the bowl.

7. The system of claim 1, wherein the mixing valve assembly includes a high speed whipping motor for driving a whipping blade attached hereto.

8. The system of claim 1, wherein the mixing valve assembly is connected to a blower motor assembly.

9. In a food and beverage dispensing system having a main dispenser for holding and dispensing a food or beverage mixture comprised of water and dry concentrate, the improvement comprising:

a replenishing dispenser connected to and stationed entirely independent of the main dispenser, the replenishing dispenser having a mixing valve for automatically and periodically blending proportioned amounts of the water and dry concentrate to form the food or beverage mixture, the mixing valve intermittently dispensing a controlled amount of the food or beverage mixture therefrom and the replenishing dispenser also having a reservoir located below the mixing valve for receiving, holding and periodically delivering the food or beverage mixture to the main dispenser in accordance with the amount of food or beverage mixture dispensed from the main dispenser.

10. The improvement of claim 9, including a whipper motor operably connected to the mixing valve for providing vigorous blending of the water and dry concentrate food or beverage mixture before being received by the reservoir.

11. The improvement of claim 9, wherein the water blending with the dry concentrate in the mixing valve is heated to a temperature greater than 120° F. so as to improve the solubility of the dry concentrate therein.

12. The improvement of claim 9, wherein the reservoir includes a heating apparatus for preventing bacteria buildup in the mixture held in the reservoir.

13. A food and beverage dispensing and replenishing system comprising:

a pre mix dispenser having at least one bowl for holding and dispensing a food or beverage mixture comprised of water and dry concentrate, the pre mix dispenser also having a temperature-controlling arrangement for maintaining the food or beverage mixture in a predetermined temperature range; and a post mix dispenser in communication with and positioned in spaced relationship apart from the pre mix dispenser, the post mix dispenser having a hopper for holding and periodically dispensing the concentrate, a tank for holding and periodically supplying the water, a mixing valve for combining the concentrate from the hopper and the water from the tank to form a water and dry concentrate mixture periodically dispensed from the mixing valve, and a reservoir for receiving the water and dry concentrate mixture from the mixing valve and eventually supplying the water and dry concentrate mixture to the bowl on the pre mix dispenser so as to replenish the food or beverage mixture dispensed from the pre mix dispenser.

14. The system of claim 13, wherein the bowl is equipped with a bowl probe assembly for monitoring the levels of the mixture in the bowl.

15. The system of claim 14, wherein the post mix dispenser is provided with a tank probe assembly for monitoring the level of water in the tank, and a reservoir probe assembly for monitoring the level of mixture in the reservoir.

16. The system of claim 13, wherein the post mix dispenser has a first circuit board for controlling the water level in the tank, a second circuit board for controlling the mixture level in reservoir, and a third circuit board for controlling the level of mixture within the bowl, all of the circuit boards being interconnected and operated in accordance with changing levels in the tank, the reservoir and the bowl.

17. The system of claim 13, wherein the tank is supplied with water from a water line connection.

18. The system of claim 13, wherein the tank is supplied with water from a portable source.

* * * * *